(12) United States Patent
Pfitzmann et al.

(10) Patent No.: US 9,501,634 B2
(45) Date of Patent: *Nov. 22, 2016

(54) EFFICIENT BROWSER-BASED IDENTITY MANAGEMENT PROVIDING PERSONAL CONTROL AND ANONYMITY

(75) Inventors: Birgit Pfitzmann, Samstagern (CH); Michael Waidner, Au (CH)

(73) Assignee: International Business Machines Corporation, Armonk, NY (US)

( * ) Notice: Subject to any disclaimer, the term of this patent is extended or adjusted under 35 U.S.C. 154(b) by 469 days.

This patent is subject to a terminal disclaimer.

(21) Appl. No.: 13/151,708

(22) Filed: Jun. 2, 2011

(65) Prior Publication Data

US 2011/0302273 A1 Dec. 8, 2011

Related U.S. Application Data

(63) Continuation of application No. 10/512,229, filed as application No. PCT/IB03/01172 on Mar. 26, 2003, now Pat. No. 7,992,195.

(51) Int. Cl.
*G06F 15/16* (2006.01)
*G06Q 20/00* (2012.01)
(Continued)

(52) U.S. Cl.
CPC .............. *G06F 21/41* (2013.01); *G06Q 20/00* (2013.01)

(58) Field of Classification Search
CPC .............. H04L 67/2814; H04L 63/08; G06F 21/6245; G06F 21/6272
USPC ........................................................ 709/217
See application file for complete search history.

(56) References Cited

U.S. PATENT DOCUMENTS 6,871,220 B1 * 3/2005 Rajan et al. ................... 709/218
7,047,558 B1 * 5/2006 Mariana ............................ 726/3
(Continued)

FOREIGN PATENT DOCUMENTS

WO    WO9956194 A2    11/1999
WO    WO0118684 A2    3/2001

OTHER PUBLICATIONS

Erdos, M. et al., "Shibboleth-Architecture DRAFT v04," Internet2, Nov. 2001. (pp. 1-39). Available at http://shibboleth.internet2.edu/docs/draft-internet2-shibboleth-arch-v04.pdf.
(Continued)

*Primary Examiner* — Phuoc Nguyen
*Assistant Examiner* — Kishin G Belani
(74) *Attorney, Agent, or Firm* — Tutunjian & Bitetto, P.C.; Vazken Alexanian (57) ABSTRACT

A system allows a reliable and efficient identity management that can, with full interoperability, accommodate to various requirements of participants. For that a system is presented for providing an identity-related information about a user to a requesting entity. The method includes a location-request step initiated by the requesting entity for requesting from a client application a location information that corresponds to a location entity possessing the identity-related information, a redirecting step for connecting the client application to the location entity in order to instruct the location entity to transfer the identity-related information to the requesting entity, and an acquiring step for obtaining the identity-related information. The acquiring step includes a contact step wherein the location entity contacts the requesting entity, a request step wherein the requesting entity requests the identity-related information, and a response step wherein the requesting entity receives the identity-related information from the location entity.

20 Claims, 5 Drawing Sheets

(51) Int. Cl.
*G06Q 40/00* (2012.01)
*G06F 7/04* (2006.01)
*H04L 9/32* (2006.01)
*G06F 21/41* (2013.01)

(56) References Cited

U.S. PATENT DOCUMENTS

| | | | |
|---|---|---|---|
| 7,904,360 B2* | 3/2011 | Evans | 705/35 |
| 2002/0073046 A1* | 6/2002 | David | 705/67 |
| 2003/0115228 A1* | 6/2003 | Horvitz et al. | 707/500 |
| 2003/0126435 A1* | 7/2003 | Mizell et al. | 713/168 |
| 2003/0172090 A1* | 9/2003 | Asunmaa et al. | 707/200 |

OTHER PUBLICATIONS

Kormann, D.P. et al., "Risks of the Passport single signon protocol," Computer Networks, vol. 33, Jun. 2000. (pp. 51-58).

Mishra, P., "Bindings and Profiles for the Oasis Security Assertion Markup Language (SAML)," Oasis, Feb. 2002. (pp. 1-30). Available at: http://www.oasis-open.org/committees/security/docs/draft-sstc-bindings-model-11.pdf.

Neumann, B.C., et al., "Kerberos: An Authentication Sewice for Computer Networks," IEEE Communications Magazine, Sep. 1994. (pp. 33-38).

International Search Report for Application No. PCT/IB03/01172 Mailed on Mar. 31, 2004.

* cited by examiner

EFFICIENT BROWSER-BASED IDENTITY MANAGEMENT PROVIDING PERSONAL CONTROL AND ANONYMITY

CROSS-REFERENCE TO RELATED APPLICATIONS

This application is a continuation of, and claims priority from, commonly-owned co-pending U.S. application Ser. No. 10/512,229, filed on Jun. 2, 2005, which application is a National Stage Entry of PCT/IB03/01172, filed on Mar. 26, 2003, and published in English with publication No. WO2003/091861 on Jul. 24, 2003, under PCT article 21(2), which in turn claims priority of EP 02009568.3, filed on Apr. 22, 2002.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The present invention is related to a method and system for providing an identity-related information about a person to a requesting entity. Moreover, the invention is related to a method for transferring the identity-related information hosted on a location entity, also referred to as wallet, to the requesting entity.

BACKGROUND OF THE INVENTION

Identity management in its widest sense means management of all the personal information about a person, including at least all the person's digital relations. Over the next decade, identity management systems in this wide sense are likely to evolve. Short-term, identity management is typically said for web single sign-on with the transfer of a small amount of data about a person.

The main business case is a general boost of electronic business: Identity management is an infrastructure issue where a standard, like the Internet and web standards, may benefit almost all parties.

Single sign-on enables a person or user to log in to different organizations while remembering only one password without allowing all the organizations to impersonate the person towards each other as simply as using the same password directly with all organizations would.

Recently, identity management, in particular single sign-on, are known. The so-called Passport system or short Passport of Microsoft Corporation is a web service operated exclusively by Microsoft Corporation that allows users to sign in to web sites and conduct e-commerce transactions. Less exclusive operations have been promised, but not revealed. Passport currently includes an authentication service, a specialized authentication service just for kids, and an express purchase service. Older system types related to identity management are classical single sign-on products, public-key infrastructures, and form fillers.

However, none of known products and proposals can, in the interoperable way needed for a global information society and general electronic business in particular, adapt to all the different requirements that the various participants in this information society and electronic business have. Particularly, all prior products and proposals fail to fulfill at least one of the following requirements, as explained below in more detail:

Req. 1. Suitability for a free choice of location entities that hold identity-related information about a person, including location entities under the respective user's own physical control, so-called local wallets, and including that multiple location entities hold info person.

Req. 2. Suitability for browser-only clients and browsers, while not making it necessary for them to rough a location entity in a proxy role, which would enable the location entity to see all the user's message contents. Clearly the browser-only users and those with local wallets are not the same—the requirement is that the server's method interoperates with both.

Req. 3. Suitability for the transfer of both authentication information and other identity-related information, where the latter may be both freely chosen by the user, such as preferences, or in need of third-party confirmation.

Req. 4. Suitability for users that want to remain anonymous, while still allowing the transfer of some identity related information, such as preferences or demographic information.

Req. 5. Flexible privacy policies for the release of identity-related information.

It may be helpful to discuss the benefits of an identity management system fulfilling these requirements, hereafter abbreviated as "Req." Req. 1 is made by companies like employers and banks who want to act as location entities for their employees or customers at least in relationships related to their business. Moreover, whether persons will embrace identity management voluntarily now is not as clear as one might be led to believe. Currently, the fear of "putting all eggs in one basket" and privacy and trust concerns outweigh the perceived benefit of both single sign-on and simplified form filling for most people. Here again, free choice as in Req. 1 may help, in particular to allow the "local" location entities for the user's truly personal information.

These latter concerns also motivate Req. 4. Req. 2 is made for practicality, both because many users cannot be made to install additional software and because some users use the information society infrastructure from varying Internet kiosks and the like. The Internet kiosk is contemplated as a public computer, e.g., in an Internet cafe. Req. 3 is for general applicability and user friendliness, e.g., to allow, with just one system, the restriction of access to certain information and only to certain users, and also the transfer of addresses, shipping information etc. to business partners. The benefit of the last part of Req. 3 and Req. 5 can be seen as follows: Transferring a small amount of data aims at standard e-commerce applications, where data like shipping and billing information are needed often and quite independent of the communication partner. In extensions to more specific data such as book and travel preferences, one will have to distinguish the partners better. Long-term comprehensive solutions will include data that need third-party confirmation; they will also manage transaction data, e.g., the person's receipts obtained from these partners; and they will integrate with other personal applications, such as a tax declaration using Furthermore, long-term solutions will integrate person-to-person applications sharing, and business-to-business applications such as employer has subscribed.

Classical single sign-on schemes and products contain a variety of login scripts or passwords for many applications.

For example, U.S. Pat. No. 5,944,824 discloses a system and method for single sign-on to a plurality of network elements. This does not allow browser-only clients unless by using a proxy (cf. Req. 2). Moreover, it only covers authentication information, not other identity-related information (cf. Req. 3), and thus also no privacy policies (Req. 5).

Classical public key infrastructures (PKIs), most notably as X509, essentially only consider authentication information (cf. Req. 3). As information is conveyed via a fixed certificate, then if it does contain other identity related information, this information is fixed, contradicting Req. 5. For special-purpose client software, one can easily design a method to send other attributes separately, e.g., in attribute certificates, but this is not compatible with browser-only clients (Req. 2), and particularly there is no interoperable method for using varying browsers (also Req. 2).

Classical products for transferring personal data in e-commerce are form fillers. They interact deeply with browsers to drag-and-drop attributes into form fields, or use powerful tools to interpret the fields in forms. They typically only work as complicated client software and else as proxies, contradicting Req. 2. Furthermore, they do not offer full interoperability, because there is no corresponding method for the servers asking for the information.

Microsoft's Passport assumes one fixed location entity or at least only a set of entities that all have the information about users in a certain domain, i.e., there is no choice by the user or based on other business relationships, e.g., choosing the user's bank as the location entity, contradicting Req. 1.

This is an intrinsic property of this system, not something that can be changed by a different usage or embodiment, because the server is assumed to know a priori to which location entity to connect. While extensions to a so-called federation are under discussion, they are likely to have some of the other deficiencies remaining, like the following systems. Passport does not yet distinguish information that needs third-party confirmation (cf. Req. 3). Furthermore, it allows no real anonymity: There is a global user identifier, which the user can only avoid by having multiple accounts and thus by difficult management, and furthermore the location entity learns the user's communication partners (cf. Req. 4). Furthermore, Passport does not allow a direct contact between the location entity, which is essential for safe transfer so that all the mentioned requirements are met.

U.S. Pat. No. 6,226,752 discloses a method and apparatus for authenticating. It does not allow a user's choice of the location entity for the same reasons as with Passport (cf. Req. 1). It only considers authentication information (cf. Req. 3) and thus no privacy policies (Req. 5) and no method for anonymity (Req. 4).

Shibboleth, a project of Internet2/MACE (Middleware Architecture Committee for Education), is developing architectures, frameworks, and technologies to support inter-institutional sharing of web resources that are subject to access controls. Shibboleth contains a method for finding the so-called university entity, and thus fulfills parts of Req. 1: The server asks the user for a user-friendly name of the university entity concerned and translates this using a further entity called WAYF that "knows the name and location of" each university entity. The redirection takes place to this location only for authentication, and the university entity then redirects the user back to the server with a second address of the university entity. The server uses this other address to establish a direct contact to the university entity, over which it sends a request and gets a response. This protocol does not allow local wallets (Req. 1) together with anonymity (Req. 4), in particular because the second address identifies the place of the university entity which, for local wallets, is the place of the user. There is no known method to make this address relative, i.e. saying only "on my machine". The first address can also not be intended to be relative because the knowledge of all names and locations of local wallets would defeat the purpose.

Yet another point incompatible with the combination of local wallets and anonymity is that all "assertions" in Shibboleth, i.e., the identity related information sent, must contain the domain name of the university entity. Furthermore, while Shibboleth includes privacy as flexible as desired (cf. Req. 5), because requests do not include privacy promises by the server. Finally, for requests where the release of the information is not pre-authorized by the user to the university entity, Shibboleth has an inefficient flow, because the browser focus (i.e., a way to ask the user) must be reestablished by a further redirect, followed by yet another redirect to the server.

From the above follows that there is still a need in the art for an improved identity management system including the exchange protocols between persons and organizations.

SUMMARY OF THE INVENTION

The present invention allows a reliable and efficient identity management that can, with full interoperability, accommodate to various requirements of participants, in particular the transfer of authentication and other identity-related information, versions where a user only has a browser or more powerful software, different location entities, also called wallets, holding information about the user, and anonymous and identified users, and the integration of privacy policies. In other words, the invention enables end users of web-based services, e.g., perform single sign-on and controlled exchange of profile information with services works advantageously with standard HTTP (hypertext) usually provide the main user interface. The presented methods and system support zero footprint version, i.e., there is no other software needed, not even active content like Javascript, Java, or ActiveX (Javascript and Java are trademarks of Sun Microsystems, Inc., ActiveX is a trademark of Microsoft Corporation). Furthermore the invention allows multiple authorities, avoiding any single point of failure. That also means that multiple authorities are supported, giving users the chance to freely select among them, without the need to trust the others. Moreover, the authorities do not need to trust each other unlike in known solutions like Passport or Kerberos. Kerberos is a network authentication protocol for providing authentication for client/server applications by using secret-key cryptography.

In accordance with the present invention, there is presented a method for providing an identity-related information to a requesting entity, the method comprising a location-request step initiated by the requesting entity for requesting from a client application a location information that corresponds to a location entity possessing the identity-related information, a redirecting step for connecting the client application to the location entity in order to instruct the location entity to transfer the identity-related information to the requesting entity, and an acquiring step for obtaining the identity-related information, the acquiring step comprising a contact step in which the location entity contacts the requesting entity, a request step in which the requesting entity requests the identity-related information, and a response step in which the requesting entity receives the identity-related information from the location entity.

The method allows that the location entity is either remote or under local control of a person or user whose identity is concerned and also allows that the location of this person remains unknown to the requesting entity, which can be a server. This also holds when the identity-related information is transferred from the location entity either (a) via the client application or (b) directly from the location entity with the location entity making the contact to the requesting entity.

The acquiring step can also comprise only a redirecting sub-step for redirecting the location entity via the client application to the requesting entity and thereby providing the identity-related information to the requesting entity.

The method can further comprise a decision step on whether the contact step is performed in dependence on the length of information to be carried in a URL (uniform resource locator). This allows to have HTTP 1.0 routers and proxies on the transport path. Usually, identity-related information that leads to overall URLs of up to a length of 255 bytes should then be usable without difficulties. The decision step can be made by the requesting entity, which, knowing that the identity-related information it requests is short enough, already transmits no contact address in the redirecting step, or, having a long request or expecting a long response, transmits only the contact address. If the requesting entity transmits information for both cases, the decision step can be made by the location entity.

It is advantageous if the transport protocol used between the requesting entity and the client application, as well as between the client application and the location entity, is a secure hyper text transfer protocol (HTTPS), because then a secured transfer of information can be guaranteed. Using such a secure channel prevents so-called man in the middle attacks.

The returned location information can be relative to the location of the client application. The location information in the redirecting step denotes "localhost" if it is relative, and if it is absolute it may be a URL (uniform resource locator) or other information identifying the location entity from which the requesting entity derives a URL by a normal address translation locally or via a directory. Information identifying a person concerned can also be used to derive by the requesting entity a URL of the appropriate location entity by a specific directory listing persons and their location entities.

The redirecting step can be performed by a hyper text transfer protocol redirect or short HTTP-redirect to localhost or the derived URL, transmitting to the location entity either an actual transfer instruction and a return address or a contact address and possibly already the transfer instruction and return address. This enables the acquiring step with more flexible transport protocols and without requiring the client application, if it is a browser, to disturb the user for pushing a "submit" button to start a PUSH operation or to have scripting enabled.

The method can further include accepting the requesting entity information together with an authentication, wherein the identity-related information corresponds to a person. This has the advantage that anonymity of the person can be reliably protected. Clearly the method also comprises normal, non-anonymous location entity identities and personal identities.

The method can further include transmitting by the requesting entity a server policy for use of the identity-related information. In particular the requesting entity or server may include a promised privacy policy or privacy preference, e.g. Platform for Privacy Preferences (P3P), for the requested identity-related information, for example, in the transfer instruction by reference or directly. It may also include another security-related policy, e.g., about secure storage. The identity-related information from the location entity can also contain or reference a prescribed privacy or other security policy. This has the advantage that the requesting entities can interact in optimized ways with persons and location entities with different policies, e.g., by then offering different degrees of personalization. The requesting entity is free to refuse continued the application-dependent interaction unless a minimum of information is provided. This may be indicated in the request, as well as other requirements on the information or its quality, such as confirmation by a certain class of authority, freshness, or liability of the confirmer.

In accordance with a second aspect of the present invention, there is presented a method for transferring an identity-related information hosted on a location entity to a requesting entity, said method comprising a redirecting step for receiving from a client application an instruction information to transfer the identity-related information to the requesting entity, wherein prior to the redirecting step the requesting entity requests in a location-request step from the client application a location information that corresponds to the location entity possessing the identity-related information, and a transfer step for transferring the identity-related information to the requesting entity comprising a contact step in which the location entity contacts the requesting entity, a request step in which the requesting entity requests the identity-related information, and a response step in which the location entity sends the identity-related information to the requesting entity.

The transfer step can further comprise deciding by the location entity on what part of the identity-related information requested in the request step to be the basis of a predefined policy. This has the advantage that request for all information that may be useful to it, but all decide, based on its own or the user's policy, which of this information it actually wants to offer, e.g., for marketing, personalization or statistical purposes.

The response step can further comprise transmitting by the location entity a part of the predefined policy. This has the advantage that the location entity can instruct the requesting entity to act in certain ways regarding the identity-related information, e.g., not to transfer it further, or to delete it after a while, or not to delete it for a certain period.

The location entity may use the connection established from the client application to the location entity in the redirecting step for the interaction with a person during the transfer step. The benefit of interacting with the person is that the person can be authenticated and can make additions to the predefined policy, and the benefit of reusing the said connection (in contrast to releasing that connection before the acquiring step) is that the interaction is possible without delay.

A release of identity-related information to the requesting entity can comprise the following steps: presenting information about the requesting entity; presenting a pre-authorized attribute values known to the location entity, where pre-authorized means that the predefined policy allows the release to the requesting entity, and/or presenting a not pre-authorized attribute values known to the location entity, and/or presenting names of attributes with values unknown to the location entity assigned to empty fields for entering respective attribute values; requesting for editing the attribute values; and sending the edited attribute values to the requesting entity. By doing so, the user is requested only to fill in unknown attribute values and to make yes/no decisions about not pre-authorized values. This simplifies the procedure and allows the user to have full control over his personal information requested by the requesting entity.

The different attribute values may be presented differently, preferably in different colors. This allows a clear presentation of the information to the user, who then can decide which information to enter, delete, amend, or send unchanged.

The transfer step can further include the steps of generating a random value k by the location entity, sending the random value k to the requesting entity as the identity-related information, to enable the client application to prove its authenticity information to the requesting entity. This has the advantage that the client application running at the user can be given additional privileges by the requesting entity after the transfer of the identity-related information.

In accordance with a third aspect of the present invention, there is presented a system for providing an identity-related information, the system comprising a location entity possessing the identity-related information, a client application connectable to the location. entity, and a requesting entity adapted to request from the client application a location information that corresponds to the location entity possessing the identity-related information, wherein, after a response to the request the client application is redirected to the location entity in order to instruct the location entity to transfer the identity-related information to the requesting entity, wherein the location entity contacts the requesting entity, the requesting entity requests the identity-related information, and the requesting entity receives the identity-related information from the location entity.

The system facilitates the identification of the relevant authority, i.e. the location entity, for a user without the need to contact any third party, thus avoiding a privacy and performance problem present in some prior art solutions.

The system works with standard, SSL-capable HTTP browsers, i.e. secure socket layer capable hyper text transfer protocol browser, and does not require any functionality that requires users to accept that some additional information, e.g. cookies, or software like active content: Javascript, Java, ActiveX, etc. is installed on their machine. At the same time, it allows for efficiency improvements in cases where additional information can be stored.

The system provides more security against certain attacks, e.g. man-in-the-middle attack, than in known solutions.

In another example, the client application interacts with several location entities. This means the user may have multiple location entities on different places or on the same place, and the client application, together with the person or user, chooses an appropriate one in answer to the request for the location information. Thereby the location entities can be local or remote. The advantage of such an arrangement is that it avoids a single point of failure for enables privacy among the different location entities.

The identity-related information can be provided by a further location entity. Then the identity-related information is obtainable by the requesting entity via the location entity. The location information of the further location entity is stored on the location entity. The advantage of such an arrangement is that it avoids that the client application or person has to choose among the location entities, while still allowing different types of identity-related information to be stored in different location entities.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

The drawings are provided for illustrative purpose only and do not necessarily represent practical examples of the present invention to scale.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

Glossary

The following are informal definitions to aid in the understanding of the description.

Person: An entity whose identity is managed. If the person acts it becomes the user. Typically the person or user is an individual, but at least small businesses will often interact with other businesses just like individuals, e.g., in travel booking and information gathering.

Requesting entity: An entity, e.g. an organization A requesting entity can include all of a person's communication partners such as banks, doctors, colleagues, and family. Colleagues and family as "organizations" are particularly relevant if one wants to include contact or location information in identity management, e.g., instant messaging and calendaring.

Location entity: An entity that stores identity-related information for a person. The location entity is also referred to as a wallet. By location entity or wallet is meant a component, typically software, that stores and handles personal information for the person. A location-entity holder may be the person itself or a party trusted by it. Becoming a professional location-entity holder may require preconditions, e.g., privacy and security promises and appropriate safeguards. A primary location-entity holder holds a person's single sign-on password; more generally, it can recognize the person without intervention of another entity. Thus a person might have several primary location entities with different types of information, if he or she can remember several passwords.

A local location entity is on a computer of that person. A remote location entity is on a computer or server of a separate location-entity holder, typically professional. It may be integrated with other location entities residing at that holder.

Federation: By a federation, one typically means a group of professional location-entity holders and location-entity manufacturers. The group may also contain representatives of persons and organizations to help with generally satisfactory standards, but persons and organizations may be millions, while entities interested in professional location-entity holding might be tens of thousands, e.g., banks, CAs (certificate authorities), ISPs (Internet service providers), and large employers.

A legal entity or organization may act in several of the roles as required.

The term computer includes devices like PCs but also digital assistants and mobile phones with browsing facilities.

DETAILED DESCRIPTION

Figure 1:
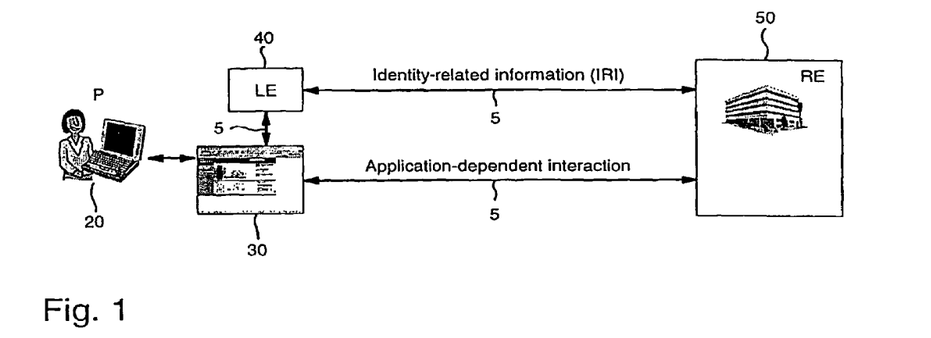
FIG. 1 shows a schematic illustration of a system according to the present invention.

With reference to FIG. 1, the general layout of a communication environment is described in which the invention can be used. In the figures, same reference signs are used to denote the same or like parts. FIG. 1 shows a person P, who acts as a user 20. The user 20 executes a client application 30, e.g. a web browser, on his computer. The client application 30 is connected for application-dependent interactions to a requesting entity 50, e.g. a server of a company or bank which provides services. The client application 30 and the requesting entity 50 are connected via communication lines 5 as they are known in the art. They are usually provided through a network, e.g. the Internet. connected to a location entity 40, also referred to as wallet, 40 can be local, i.e. at the computer of the user 20, or remote, i.e. on an external server or the like. The location entity 40 is also connectable to the requesting entity 50 for the transmission of identity-related information IRI. Under the term identity-related information IRI is understood any information related to a person or user. Identity-related information IRI comprises names, addresses, group memberships, authorization credentials, demographic data, personal preferences, calendar entries, medical and financial information, and everything else that may be stored digitally about a person or under a user name. The requesting entity may desire it for access control, authorization, personalization, authentication, login, commercial, medical, or governmental issues, or any other application operating on identity-related information IRI. The scenario in FIG. 1 is shown to facilitate the description of the following flows for providing the identity-related information IRI to the requesting entity 50.

Figure 2:
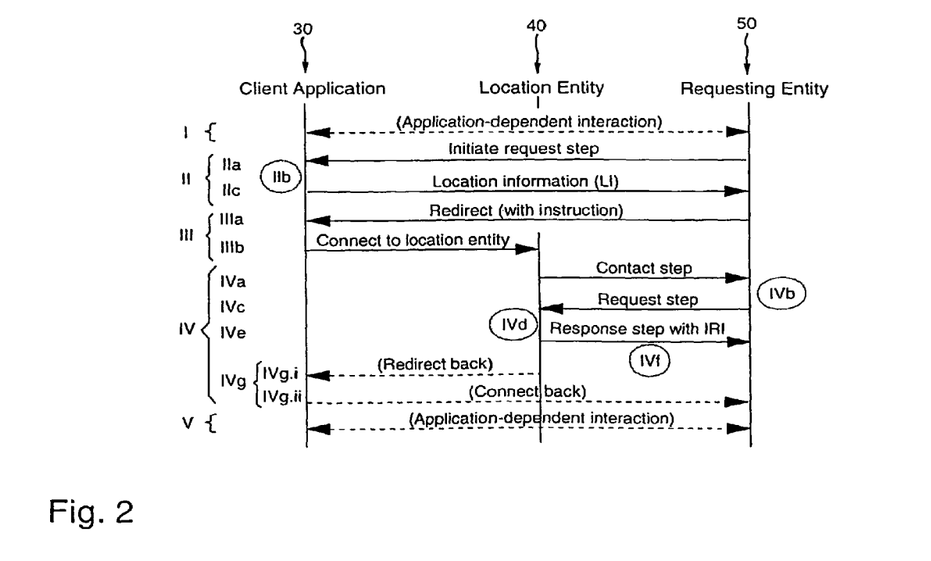
FIG. 2 shows a schematic illustration of the message flow of a first embodiment according to the present invention.

FIG. 2 shows a schematic illustration of a message flow of a first embodiment. Therein, the flow between the client application 30, the location entity 40, and the requesting entity 50 is depicted with labeled arrows to which respective Roman numbers are assigned. Further steps or sub-steps are indicated by Roman numbers in a circle. The flow is understood as being performed sequentially from top to bottom as indicated by the increasing Roman numbers. In step I application-dependent interactions are performed between the client application 30 and the requesting entity 50. In a location-request step II, which is initiated by the requesting entity 50 (sub-step IIa), the requesting entity 50 requests from the client application a location information LI that corresponds to the location entity 40 that possesses the identity-related information IRI. The location information LI is sent to the requesting entity 50 in sub-step IIc. Optionally, sub-step IIb allows the client application 30 to derive the location information, for example, by asking the user 20 or internally. It follows a redirecting step III with a redirect instruction (sub-step Ma) wherein after all the client application 30 is connected to the location entity 40 (sub-step IIIb). By doing so the location entity 40 is instructed to transfer the identity-related information IRI to the requesting entity 50. In the acquiring step IV the requesting entity 50 obtains the identity-related information IRI as follows. A contact step IVa is performed wherein the location entity 40 contacts the requesting entity 50. Then, a request step IVc is performed wherein the requesting entity 50 requests the identity-related information IRI from the location entity 40.

Finally, the requesting entity 50 receives in a response step IVe the information IRI from the location entity 40. The request can be retrieved in different as indicated by sub-step IVb, e.g., by a session identifier the redirecting step III and the location entity 40 includes in the contact step IVa. Moreover, the location entity 40 can decide on whether to respond at all and what, e.g., by user authentication, policies, or the like, as indicated by sub-step IVd. The response can be prepared using internal and possibly external information. Sub-step IVf indicates a possible repetition of the request and response steps IVc and IVe to get more identity-related information IRI, or to resolve errors, and a possible end-message for this exchange. As indicated by the sub-step IVg, a redirect from the location entity 40 (redirect back step IVg.i) via the client application 30 to the requesting entity 50 in a connect back step IVg.ii can be performed. Application-dependent interactions between the client application 30 and the requesting entity 50 are then possible again, as indicated with step V.

Figure 3:
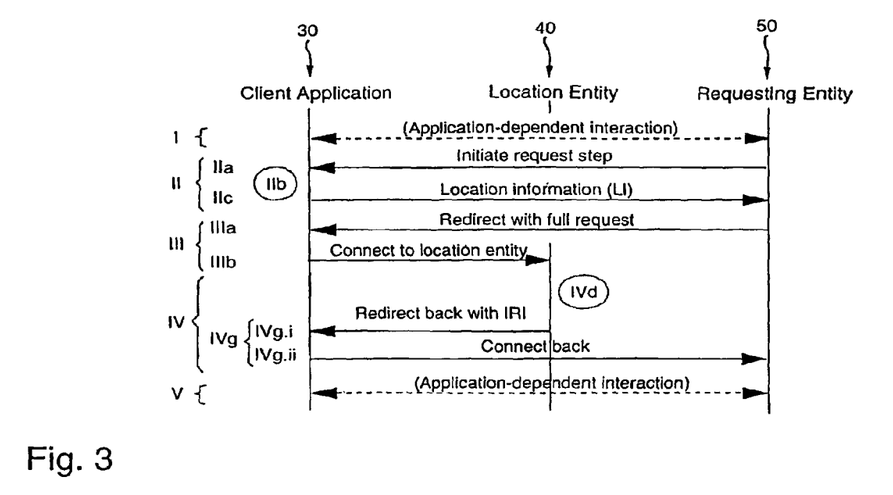
FIG. 3 shows a schematic illustration of an embodiment wherein the acquiring step is performed without the contact, request and response steps, according to an embodiment of the present invention.

FIG. 3 shows a schematic illustration of a second embodiment with a similar message flow compared to the first embodiment with the difference in that the acquiring step IV is performed without the contact, request, and response steps IVa, IVc, IVe. Instead, the redirecting sub-step IVg, where the location entity 40 is connected via the client application 30 to the requesting entity 50, is now performed such that it transfers the identity-related information IRI. In that scenario, the location entity 40 interacts with the user 20 in sub-step IVd, so that the user 20 authenticates himself. In some cases, the user 20 also should confirm the identity of the requesting entity 50 in sub-step IVd because the location entity 40 cannot recognize the requesting entity 50 by itself.

Figure 4:
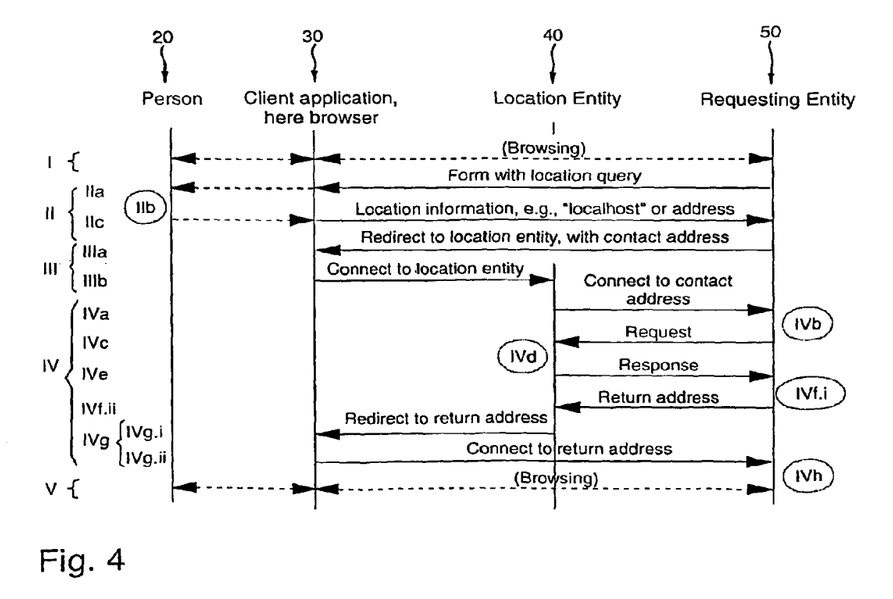
FIG. 4 shows a schematic illustration of another embodiment of the present invention.
Figure 5:
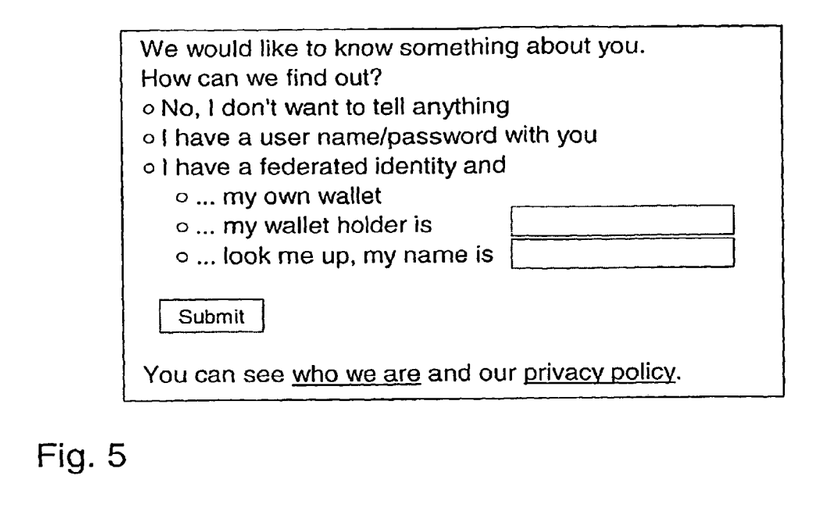
FIG. 5 shows an illustration of a form to be presented to a potential user with a location query as sent in step II in FIG. 4.

FIG. 4 shows a schematic illustration of the message flow of a third embodiment in which a secure channel is assumed, as it can be provided by a secure hyper text transfer protocol (HTTPS). The secure channel is assumed between the requesting entity 50 and the client application 30 (not shown). The third embodiment is browser-specific. That means, the client application 30 is here a browser 30 that is controlled by the user 20. A further column is in FIG. 4 on the left-hand side of the figure and labeled with person 20 that implies the acting user 20. The user 20 is requested to interact with the browser 30. In step I the user 20 is browsing to the requesting entity 50. The location-request step II can sometimes be omitted as in known solutions if the browser 30 visited the requesting entity 50 before, and there is either still a session open, or the requesting entity 50 sets and the browser 30 accepts cookies, or the browser 30 automatically transfers certain user settings. In the sub-step IIa a form with a location query is transmitted from the requesting entity 50 to the browser 30 and presented to the user 20. The presentation can be performed in the way as shown in FIG. 5, where the user 20 uses the location information LI that possesses the identity-related information IRI LI is sent as "localhost", which indicates that the address to the requesting entity 50 in sub-step IIc. Sub-step IIa and sub-step IIc locate the location entity 40 in preparation for the redirecting step III. If all location entities 40 (only one is shown here) were local, the redirect could be to a fixed port at "localhost"; similarly, with just one remote location-entity holder, the redirect could be directly to that.

However, different remote location entities 40 have to be distinguished, and even one user 20 can have multiple location entities 40. The simplest way to build the overall user interaction for these steps is to show the user the above-mentioned form on a screen as shown in FIG. 5. The redirecting step III comprises the sub-step IIIa, now an HTTP redirect, wherein a contact address is transmitted from the requesting entity 50 to the browser 30 and the sub-step IIb wherein the browser 30 is connected to the location entity 40. The contact address contains a protocol binding, which may be HTTP, but also another protocol such as a SOAP (Simple Object Access Protocol) binding. Additionally, a session identifier SID is transferred for use in sub-step IIb. Transfer of other information like the last URL requested in step I is possible but less recommended because it may violate the user's privacy towards the location entity 40. If the requesting entity 50 guesses that the desired identity-related information IRI is short, it can immediately include the exact request and the return address (useable in sub-step IVg). If it is sure, it may even omit the contact information. A safe definition for "short" is that the resulting overall URL in sub-step IVg will not exceed 255 bytes. By obtaining a connection message in sub-step IIb, the location entity 40 is instructed to transfer the identity-related information IRI to the requesting entity 50.

In the acquiring step IV the requesting entity 50 obtains the identity-related information IRI as follows. In the contact step IVa, the location entity 40 is connected to the contact address, i.e. the requesting entity 50, using the protocol contained in the contact address unless it proceeds as described with reference to FIG. 3. The request step IVc is performed wherein the requesting entity 50 requests the identity-related information IRI from the location entity 40 over the connection set up in the contact step IVa, retrieving the appropriate request according to the session identifier SID. The request may be in any known form, e.g., an agreed-upon Extensible Markup Language (XML) schema. The requesting entity 50 receives in the response step IVe the identity-related information IRI from the location entity 40. The response will be in a known form corresponding to that of the request, e.g., from a corresponding response XML schema. The location entity 40 can decide on whether to respond at all and what, e.g., by evaluating user authentication, policies, authentication and credentials submitted by the requesting entity 50 with the request, real-time, or the like, as indicated by sub-step IVd. Sub-step IVf.i indicates that the return depend on the received response, e.g., different personalized resource. The return address is then sent by the requesting entity 50 to the location entity 40, as indicated with sub-step IVf.ii.

Then, the redirect is performed as indicated by the sub-step IVg. Therein the return address is transmitted in sub-step IVg.i from the location entity 40 to the client application 30, which is further connected to the return address, i.e. to the requesting entity 50, as indicated in the connect back step IVg.ii. This step may carry additional information, e.g., for authenticating the browser 30 as explained below with reference to FIG. 6. Sub-step IVh allows the requesting entity 50 to look up the appropriate response received in the response step IVe for the connecting browser 30 in any known way, and thus to use the response in further interactions with this browser 30. The use of HTTPS provides secure sessions for this, they may be augmented by other known session maintenance mechanisms. Browsing, executed by user 20, between the browser 30 and the requesting entity 50 is then performable again, as shown in step V.

FIG. 5 shows an illustration of a form or example screen to be presented to a potential user with a location query as presentable in the location-request step II in FIG. 4. To make it realistic, a refusal to identify and legacy authentication by user name and password are also shown, as well as links to information about the requesting entity 50, e.g., an organization, which information may help the user 20 to decide what to fill in. The "o"s are radio buttons, the fields are for entering text. The words "federated identity" can stand for a brand name to be chosen. Selecting "my own wallet" gives a redirect to "localhost", i.e. the location entity 40 which is on local. Inputting a "wallet holder" redirects to the location or server address of a remote location entity 40. The lookup choice leads the requesting entity 50 to look for the name entered after "my name is" in a global directory; this option decreases privacy but some people might forget their location entity's address. The user 20 can inform himself about the requesting entity 50 under "who we are" and about the policies under "privacy policy". With the "Submit" button the information can be submitted. As described with reference to FIG. 4, there are several ways to allow users to avoid such a screen if they always allow their location entity 40 to be contacted.

Figure 6:
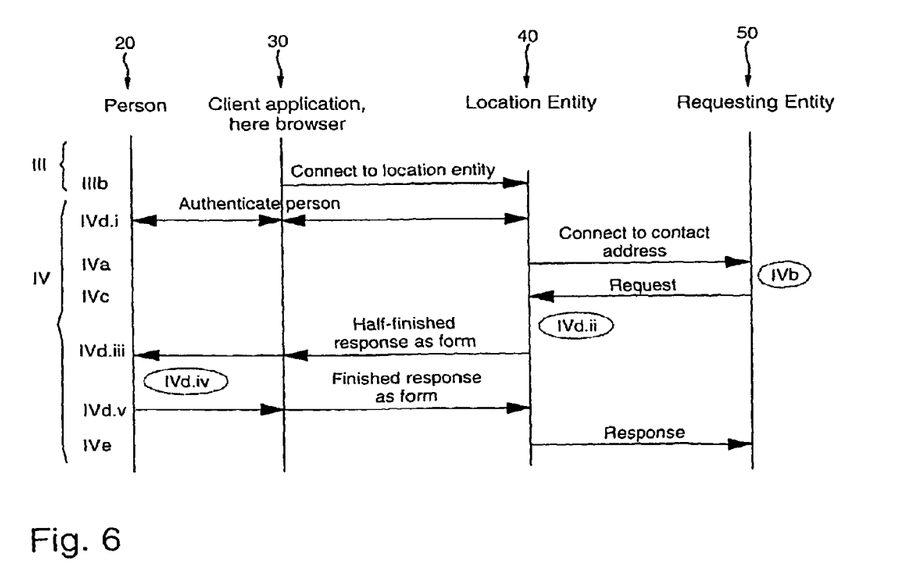
FIG. 6 shows a schematic illustration of an extension of the third embodiment as shown in FIG. 4.

FIG. 6 shows a schematic illustration of an extension of the third embodiment as shown in FIG. 4, in particular an embodiment of sub-step IVd, the derivation of a response. Only the relevant flows are depicted. In sub-step IIb the browser 30 connects to the location entity 40. In the acquiring step IV the requesting entity 50 obtains the identity-related information IRI. Therein in sub-step IVd.i an authentication of the person is performed. This sub-step IVd.i can in parallel when the contact step IVa and the request if a secure session according to a known mechanism is form is presented to the user 20 in sub-step IVd.iii. A sub-step IVd.ii indicates the preparation of the response as far as possible while using a predefined policy, and the transformation from the request-response format to a user-friendly form. The user 20 can adapt the form in sub-step Ivd.iv before the finished response as form is transmitted in the release sub-step IVd.v from the browser 30 to the location entity 40 which finally forwards it, now again in the request-response format, to the requesting entity 50 in the response step IVe.

Figure 7:
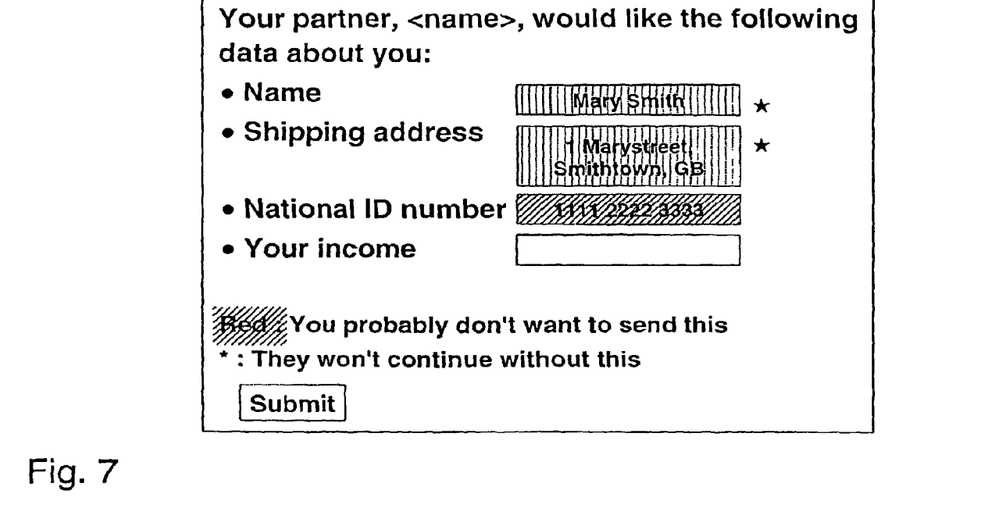
FIG. 7 shows an illustration of another form to be presented to the user which form is half-finished.

FIG. 7 shows an illustration of a half-finished form as to be presented to the user 20 in sub-step IVd.iii in FIG. 6. The initial text explains the form and specifies who asks for this information, i.e., <name> is the name of the requesting entity 50, as obtained by the location entity 40 in the authentication of the requesting entity 50 during the contact step IVa. If no such authentication precedes the response step IVe in another embodiment, this line in such a form should be formulated differently accordingly, e.g., the user 20 should be asked to check the server certificate in the HTTPS connection from step I. The "Name", "Shipping address", "National ID number", and "Your income" are examples of attributes or attribute names. Their respective attribute values are already entered for the "Name", "Shipping address", and "National ID number", because these are assumed to be known to the location entity 40 in this example. "Your income" is not known to the location entity 40 and therefore empty. Among the known attributes, "Name" and "Shipping" address are assumed to be pre-authorized, while "National ID number" is not. Therefore their attribute values are presented in different user-interface styles, e.g. in different colors, so that the user 20 sees easily which information is sensitive and which not. The user 20 has full flexibility to edit or delete the given attribute values and to add missing attribute values. Optionally, the user 20 gets an indication on what is necessary to submit or confirm by. That means the presentation additionally includes elements that characterize attributes as mandatory or voluntary from the point of view of the receiving entity 50. The meaning of the user interface elements and indicators is explained, in our example in the lines starting with "Red:" and "*:" The "Submit" button allows the submission of the information in the form. In a further example, an iteration of sub-steps IVd.iii to IVd.v can be performed where the attributes are presented in the repetitions of the sub-step Ivd.iii with additional annotations by the location entity 40, e.g., error messages, and the response to the requesting entity 50 is only made after the last iteration of the release in sub-step IVd.v. The presentation can be executed as a normal web form fields for the attributes. In another example, none of the attributes are released if no attributes are available and authorized after the editing of the steps with the specific annotation that mandatory attributes are missing.

Figure 8:
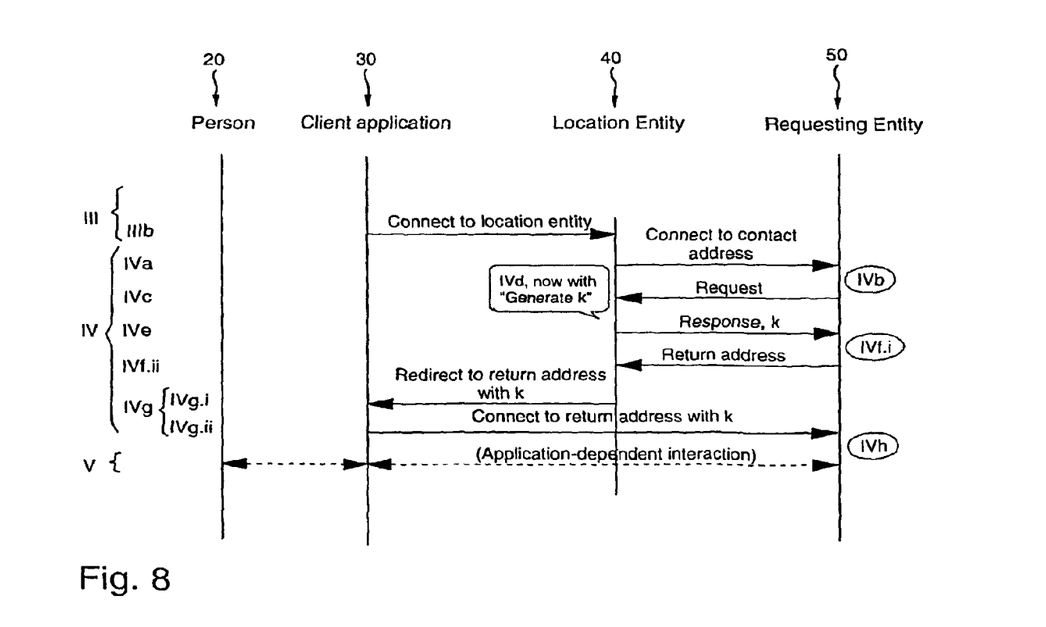
FIG. 8 shows a schematic illustration of an extension of the first or third embodiment allowing authenticity of the client application.

FIG. 8 shows a schematic illustration of an extension of the first or third embodiment providing authenticity of the browser 30 in sub-step IVg. In view of the location entity 40 the acquiring step IV is here referred to as the transfer step IV. FIG. 8 already starts with the second part of the redirecting step III where the client application 30 connects to the location entity 40 in sub-step Mb. The contact step IVa is performed in that the location entity 40 contacts the requesting entity 50. Then, the request step IVc is performed in that the requesting entity 50 requests the identity-related information IRI from the location entity 40. In sub-step IVd a random value k is generated by the location entity 40. The response together with the random value k is sent to the requesting entity 50 in response step IVe. Sub-step IVf.ii indicates the transmission of the return address from the requesting entity 50 to the location entity 40. Then, the redirect is performed as indicated by the sub-step IVg. Therein the return address with random value k is transmitted in sub-step IVg.i from the location entity 40 to the client application 30, which is further connected to the return address, i.e. to the requesting entity 50 which receives the random value k, as indicated in the connect back step IVg.ii. In sub-step IVh the requesting entity 50 uses the received random value k to look up the response received in the response step IVe where the same random value k occurred.

Application-dependent interactions, initiated by the requesting entity 50, between the client application 30 and the requesting entity 50 are then performable again, as shown in step V. By sending the random value k to the client application 30, the client application 30 is enabled to prove its authenticity with respect to the identity-related information IRI to the requesting entity 50. In another example, the value k is only pseudo-random, or even only partially pseudo-random. However, it should be practically unguessable in all correct examples.

Figure 9:
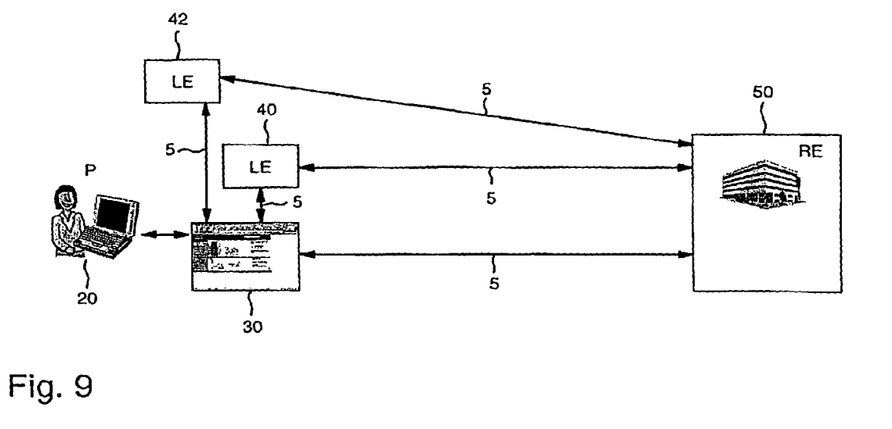
FIG. 9 shows a schematic illustration of the system where one client application interacts with several location entities.

FIG. 9 shows a schematic illustration of an extension of the communication environment as described with reference to FIG. 1. A second location entity 42 is arranged additionally to FIG. 1. The second location entity 42 can be local or remote and is connectable to the client application 30 and the request entity 50 via the communication lines 5. Generally, one client application 30, i.e. one browser 30, interacts here with several location entities 40, 42, and selects an appropriate one in the location-request step II.

Figure 10:
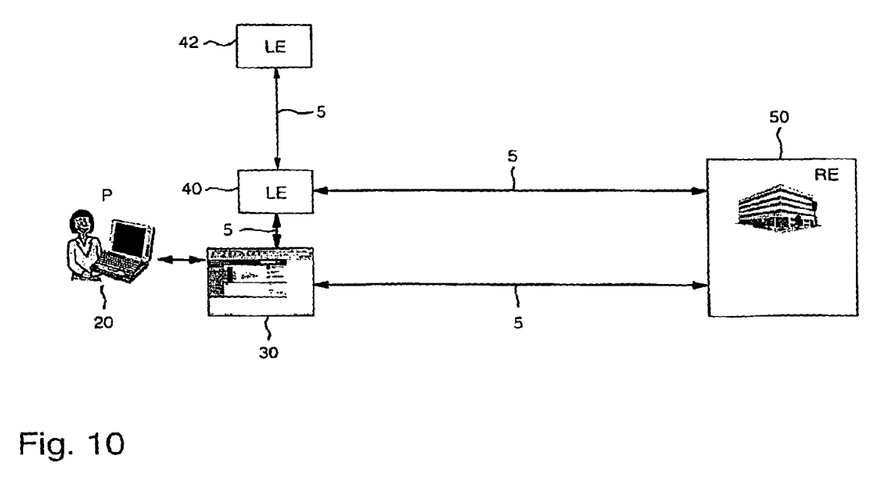
FIG. 10 shows a schematic illustration of the system where an identity-related information is provided by a further location entity and is obtainable by a requesting entity via the location entity.

FIG. 10 shows a schematic illustration of another arrangement of the communication environment as described with reference to FIG. 1 or FIG. 9. The identity-related here provided by one further location entity, i.e. the second information IRI is obtainable by the requesting entity 50 hereafter also referred to as first location entity 40. The location information LI of the second location entity 42 is hence stored on the first location entity 40, together with indications what identity-related information IRI the second location entity 42 holds. Thus the client application 30 can always select one first location entity 40 in the location-request step II. The example shows the second location entity 42 only connected to the first location entity 40, indication an embodiment where the first location entity 40 retrieves the identity-relation information IRI directly from the second location entity 42 within the sub-step IVd. The identity relation may carry authentication or other security attributes from the second location entity 42.

In another example, the first location entity 40 can redirect the client application 30 to the second location entity 42 within sub-step IVd to also allow the second location entity 42 interaction with the user 20. In a further example, the second location entity 42 may forward contact information of the requesting entity 50 to the second location entity 42 so that the second location entity 42 can transfer its identity-relation information IRI directly to the requesting entity 50.

All examples as shown in the figures assumed that the requesting entity 50 and the location entity 40 (or 42) can directly authenticate each other. This can easily be achieved with known techniques, e.g., by using public-key certificates with a common set of root authorities agreed upon in the respective federation. For instance, the requesting entity 50 may use a secure socket layer (SSL) server certificate to authenticate to the location entity 40 in the contact step IVa, if the connection is via HTTPS or another protocol using TCP (Transmission Control Protocol). To enable anonymity, the location entity 40 should not always use such a certificate, e.g., if only freely choosable identity-related information IRI is requested.

If identity-related information IRI needs confirmation by a known authority (which may be the first location entity 40 entity 42 in FIG. 10), that can, for instance, be given by an XML signature with respect to an X509 certificate. In another example, the requesting entity 50 and location entity 40 (or 42) may have exchanged special keys beforehand and use those. In a further example, one may want to use symmetric keys only (at least besides HTTPS), but the requesting entity 50 and location entity 40 have not exchanged keys a priori. This is also possible, but somewhat decreases anonymity or requires stronger trust of different entities in each other. In particular, with reference to FIG. 2, the contact step IVa could be extended by a Kerberos key exchange protocol for the location entity 40 and requesting entity 50 via a chain of intermediaries. With reference to location entity 40 can start the same protocol, or the client application 30 can be a chain of intermediaries that each grant it a new "IRI (here typically authentication information) based on the previous ticket, similar to Kerberos but within HTTP instead of as key exchange.

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation, b) reproduction in a different material form.

We claim:

1. A system for providing identity-related information, said system comprising:
    A) a requesting entity computer;
    B) a client application interacting with the requesting entity computer, performing browser-based application-dependent interactions; and
    C) at least one location entity computer possessing identity-related information of an anonymous user of the client application, wherein said identity-related information comprises at least a pseudonym of the anonymous user, and a reference to a prescribed security policy setting requirements on said identity-related information;
    wherein the requesting entity computer is configured to perform:
    requesting from the client application location information corresponding to a location entity computer selected by the client application;
        receiving the location information from the client application;
    responsive to receiving the location information, issuing a redirect command to the client application, said redirect command suspending the communication with the client application, pursuant to which the client application establishes a connection with the selected location entity computer for instructing said selected location entity computer to transfer the identity-related information to the requesting entity computer;
    wherein the redirect instruction further enables the selected location entity computer to recognize the requesting entity computer;
    once recognized by the location entity computer, obtaining the identity-related information, the obtaining step comprising:
        receiving contact from the selected location entity computer;
        providing authentication to the selected location entity computer;
        requesting the identity-related information from the selected location entity computer; and
        receiving the identity-related information from the selected location entity computer, along with a part of the prescribed security policy instructing the requesting entity to act in certain ways regarding said identity-related information;
    wherein the identity-related information does not breach the user's anonymity; and
    receiving a connect back from the client application, thereby resuming the communication with the client application.

2. The system of claim 1 wherein one client application interacts with multiple location entity computers.

3. The system of claim 1, wherein the identity-related information is provided by a further location entity computer and is obtainable by the requesting entity computer via the selected location entity computer, the location information of the further location entity computer being stored on the selected location entity computer.

4. The system of claim 1 wherein the transport protocol used between the requesting entity computer and the client application, and between the selected location entity computer and the client application, is a secure Hyper Text Transfer Protocol.

5. The system of claim 1 wherein the received location information is relative to a location of the client application.

6. The system of claim 1 wherein requesting the identity-related information further comprises a step of accepting an authentication from the selected location entity computer under a location entity pseudonym.

7. The system of claim 1 wherein the selected location entity computer is remote from the client application.

8. A system for providing identity-related information, said system comprising:
    A) a requesting entity computer;
    B) a client application interacting with the requesting entity computer, performing browser-based application-dependent interactions; and
    C) at least one location entity computer possessing identity-related information of a user of the client application who is anonymous to the requesting entity computer;
    wherein the identity-related information comprises a pseudonym of the anonymous user, and a reference to a prescribed security policy setting requirements on said identity-related information;
    wherein the client application performs the following steps:
        receiving a location request from the requesting entity computer for requesting location information of a location entity computer selected by the client application;
        transmitting the location information of the selected location entity computer to the requesting entity computer;
        receiving a redirect command comprising a redirect instruction from the requesting entity computer, said redirect suspending the communication with the requesting entity computer;
    pursuant to the redirect command, establishing a connection with the selected location entity computer for instructing the selected location entity computer to transfer the identity-related information to the requesting entity computer, wherein the selected location entity computer is unable to recognize the requesting entity computer without instruction from the client application;

receiving a redirect command from the selected location entity computer after the requesting entity computer has provided authentication to the selected location entity computer and received the requested identity-related information, along with a part of the prescribed security policy instructing the requesting entity to act in certain ways regarding said identity-related information, wherein said identity-related information does not breach the user's anonymity; and resuming the interaction with the requesting entity computer.

9. The system of claim 8 wherein a transport protocol used between the requesting entity computer and the client application, and between the selected location entity computer and the client application is a secure Hyper Text Transfer Protocol.

10. The system of claim 8 wherein the selected location entity computer is remote from the client application.

11. The system of claim 8 wherein the step of establishing the connection with the selected location entity computer comprises establishing a connection with a first of a plurality of location entities, wherein different types of identity-related information are stored in each of the plurality of the location entities.

12. The system of claim 11 wherein the first of the plurality of the location entities stores location information for a second of the plurality of location entities.

13. The system of claim 11 further comprising:
preceding the transmitting step with a step of generating a value k;
wherein the transmitting step further comprises transmitting the generated value k together with the requested identity information;
receiving a return address from the requesting entity computer; and
wherein the performing step further comprises transmitting the generated value k and the return address to the client application, such that the client application is able to connect to the return address and the requesting entity computer is able to authenticate the client application using the generated value k.

14. The system of claim 13 wherein the value k is randomly generated.

15. The system of claim 11 wherein the selected location entity computer stores location information for one of a plurality of location entity computers.

16. A computer program product for providing identity-related information, said computer program product comprising a non-transitory computer readable storage medium comprising computer program instructions causing a computer to perform:
at a requesting entity computer, requesting location information from a client application, said location information corresponding to at least one location entity computer possessing the identity-related information of an anonymous user engaged in communication with said client application for performing application-dependent interactions with the requesting entity computer;
wherein said identity-related information comprises at least a pseudonym of the anonymous user, and a reference to a prescribed security policy setting requirements on said identity-related information;

at the requesting entity computer:
receiving the location information from the client application, said location information specified a location entity computer selected by said client application;
issuing a redirect command comprising a redirect instruction to the client application, said redirect command suspending the communication with the client application, pursuant to which the client application establishes a connection with the selected location entity computer for instructing the selected location entity computer to transfer the identity-related information to the requesting entity computer;
wherein the redirect instruction further enables the selected location entity computer to recognize the requesting entity computer;
once recognized by the location entity computer, obtaining the identity-related information, the obtaining step comprising:
receiving contact from the selected location entity computer;
providing authentication to the selected location entity computer;
requesting the identity-related information from the selected location entity computer; and
receiving the identity-related information from the selected location entity computer, along with a part of the prescribed security policy instructing the requesting entity to act in certain ways regarding said identity-related information;
wherein said identity-related information does not breach the user's anonymity, wherein the receiving step prompts the selected location entity computer to issue a redirect command to the client application using a hypertext transfer protocol redirect and a simple object access protocol; and
receiving a connect back from the client application, thereby resuming the communication with the client application.

17. The computer program product of claim 16 further comprising computer program instructions causing a computer to perform:
preceding the transmitting step with a step of generating a value k;
wherein the transmitting step further comprises transmitting the generated value k together with the requested identity information;
receiving a return address from the requesting entity computer; and
wherein the performing step further comprises transmitting the generated value k and the return address to the client application, such that the client application is able to connect to the return address and the requesting entity computer is able to authenticate the client application using the generated value k.

18. The computer program product of claim 17 wherein the value k is randomly generated.

19. The computer program product of claim 16 wherein the selected location entity computer stores location information for one of a plurality of location entity computers.

20. The computer program product of claim 16 wherein a transport protocol used between the requesting entity computer and the client application, and between the selected location entity computer and the client application is a secure Hyper Text Transfer Protocol.

* * * * *